(12) United States Patent
Falkenstein et al.

(10) Patent No.: US 8,167,065 B2
(45) Date of Patent: May 1, 2012

(54) METHOD FOR DYNAMIC TORQUE COORDINATION OF POWER UNITS OF A HYBRID DRIVE OF A VEHICLE, AND CORRESPONDING DEVICE

(75) Inventors: Jens-Werner Falkenstein, Aalen (DE); Markus Vogelgesang, Ingersheim (DE); Martin Lang, Hausleitel (AT)

(73) Assignee: Robert Bosch GmbH, Stuttgart (DE)

( * ) Notice: Subject to any disclaimer, the term of this patent is extended or adjusted under 35 U.S.C. 154(b) by 665 days.

(21) Appl. No.: 12/231,796

(22) Filed: Sep. 4, 2008

(65) Prior Publication Data

US 2009/0133945 A1    May 28, 2009

(30) Foreign Application Priority Data

Sep. 6, 2007   (DE) .......................... 10 2007 042 350

(51) Int. Cl.
*B60W 10/04* (2006.01)
(52) U.S. Cl. ............... 180/65.265; 180/65.285; 903/930
(58) Field of Classification Search ............ 180/65.265, 180/65.275, 65.28, 65.285; 903/930; 701/22, 701/70
See application file for complete search history.

(56) References Cited

U.S. PATENT DOCUMENTS

| | | | | |
|---|---|---|---|---|
| 4,335,429 | A * | 6/1982 | Kawakatsu | 701/102 |
| 6,787,932 | B2 * | 9/2004 | Takaoka et al. | 290/40 C |
| 6,932,175 | B2 * | 8/2005 | Teraji et al. | 180/65.23 |
| 2003/0230441 | A1 | 12/2003 | Teraji et al. | |
| 2009/0205888 | A1 * | 8/2009 | Steuernagel et al. | 180/65.265 |

FOREIGN PATENT DOCUMENTS

| | | |
|---|---|---|
| DE | 102006006107 | 8/2007 |
| DE | 102006007983 | 8/2007 |
| DE | 102006016133 | 10/2007 |
| DE | 102006044427 | 4/2008 |

* cited by examiner

*Primary Examiner* — John Walters
(74) *Attorney, Agent, or Firm* — Kenyon & Kenyon LLP

(57) ABSTRACT

A method and device for dynamic torque coordination of power units of a hybrid drive of a vehicle, in particular a motor vehicle. The method has a plurality of successive coordination stages, each coordination stage being assigned an operating range for at least one of the power units, and each coordination stage making at least one demand on a first power unit and/or a second power unit as a function of an overall setpoint torque requested from the hybrid drive, a subsequent coordination state having an enlarged operating range compared to a preceding coordination stage, and the subsequent coordination stage is used if the demand was unable to be satisfied within the operating range of the assigned coordination stage.

11 Claims, 3 Drawing Sheets

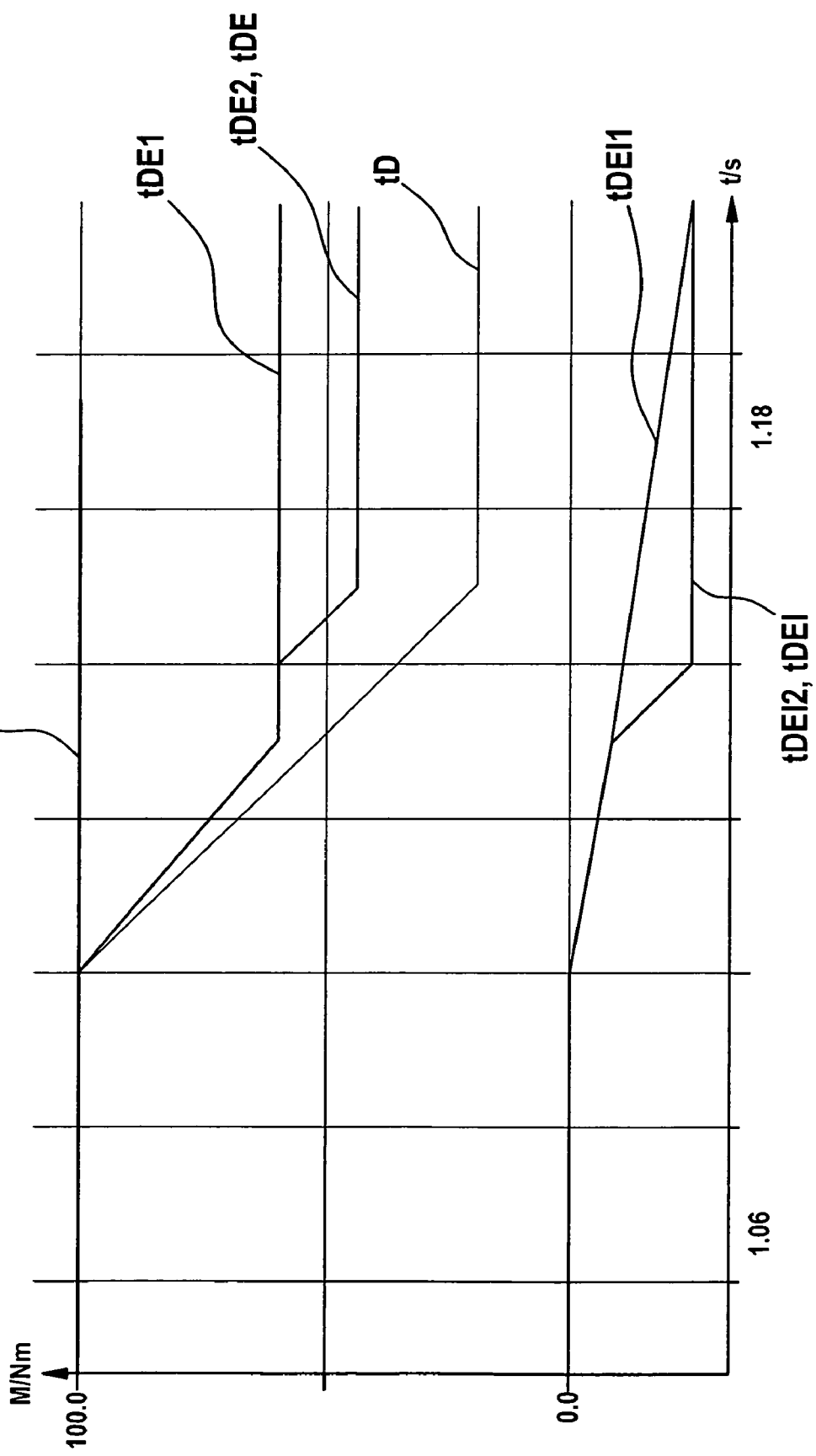

METHOD FOR DYNAMIC TORQUE COORDINATION OF POWER UNITS OF A HYBRID DRIVE OF A VEHICLE, AND CORRESPONDING DEVICE

CROSS REFERENCE

The present application claims the benefit under 35 U.S.C. §119 of German Patent Application No. 102007042350.2 filed on Sep. 6, 2007, which is expressly incorporated herein by reference in its entirety.

FIELD OF THE INVENTION

The present invention relates to a method for dynamic torque coordination of power units of a hybrid drive of a vehicle, in particular a motor vehicle.

BACKGROUND INFORMATION

If the hybrid drive is a parallel hybrid drive of a vehicle, for example, then the torques of a first power unit, e.g., a combustion engine, and a second power unit, e.g., an electric machine, are added up. This electric machine, as starter generator, is connected to a belt drive, for instance, or to a crankshaft of the combustion engine. While the torque of the electric machine is able to be set virtually without any delay in time, the combustion engine has a finite adjustment rate of its actual torque. A combustion engine in the form of an Otto engine is usually equipped with an electronic throttle valve to regulate the air mass flow. The adjustment rate of the throttle valve and dynamic charge effects in an intake manifold of the combustion engine do no allow a highly dynamic setting of a specified air mass flow and of the instantaneous torque it generates. A lead setpoint torque is acting on the air path formed in this manner. In an efficiency-optimized operation of the combustion engine, with an ideal ignition angle, the combustion engine generates a basic torque that is optimal (ideal) with regard to efficiency. The transfer from lead setpoint torque to efficiency-optimized basic torque defined by the air path dynamics, is able to be described approximately with the aid of a series connection of a deadtime element and a delay element of the first order (PT1-element). Considerably higher dynamics are achievable with the aid of the electric machine on the one hand, and with the aid of an ignition timing adjustment in the combustion engine on the other.

For example, in the conventional methods for dynamic torque control of the power units of a hybrid drive, a base load is supplied by the combustion engine by an efficiency-optimized basic torque, while temporary torque requirements are supplied by the electric machine or partially also by ignition-angle interventions in the combustion engine. However, the conventional methods for dynamic torque coordination have no overall concept which implements a specified overall setpoint torque in a highly dynamic manner in a broad working range and which simultaneously takes specified marginal conditions into account, especially with regard to fuel consumption (efficiency), exhaust emissions and service life of the power units.

SUMMARY

For a dynamic torque coordination in a broad working range, the example method includes a plurality of successive coordination stages, each coordination stage being assigned an operating range for at least one of the power units (drive units), and each coordination stage making at least one request to a first power unit and/or a second power unit as a function of an overall setpoint torque requested from the hybrid drive, a subsequent coordination stage having an expanded, larger operating range than a previous coordination stage, and the subsequent coordination stage being used if the request was unable to be satisfied within the operating range of the assigned coordination stage. Via the coordination stages, the method defines the demand on at least one of the power units. Initially, one coordination stage is assumed, which constitutes a start coordination stage, which is followed by at least one additional coordination stage. The start coordination stage has a limited operating range within which the demand on the power unit may lie. The method according to the present invention for the dynamic torque coordination of a plurality of power units has at least two coordination stages, and a restriction defining the operating range of one of the preceding coordination stages is lifted in each following coordination stage if the precise implementation of the overall setpoint torque requires it. Thus, a prioritized implementation of the requests is achievable. It is provided, in particular, that parameters are assigned to the individual coordination stages as a function of an operating state of a drive train. The requests are torque requests to the power units, in particular. As an alternative or in addition, the requests are power requests or rotational speed requests to the power units.

The example method according to the present invention is used for the dynamic torque coordination of power units of a parallel hybrid drive of a vehicle. In a parallel hybrid drive, the overall instantaneous torque is made up of the torques of the individual power units weighted by a transmission. The compound preferably is a direct addition of the instantaneous torques of the individual power units. In a parallel hybrid drive, preferably at least one of the coordination stages has one request for each of the power units.

In one simple example, the method assigns torque limits only to one of the power units, e.g., the first power unit. If the hybrid drive cannot generate the overall setpoint torque with the aid of the request of the assigned coordination stage to the first power unit, then the coordination stage following the coordination stage will be used. This subsequent coordination stage has a larger operating range than the operating range of its preceding coordination stage, so that a request to another power unit—the second power unit in this case—is restricted. If the hybrid drive is able to satisfy the requested overall setpoint torque by the demand within the operating range of the subsequent coordination stage, then the hybrid drive is operated accordingly. If the power unit is unable to satisfy the demand of the subsequent coordination stage as well, then an additional subsequent coordination stage is used, and so forth.

If a demand to a power unit is unable to be satisfied within the operating range of the coordination stage, then the demand will advantageously be forwarded, in full or in part, to another power unit. For example, if the first power unit in a coordination stage is unable to satisfy the demands, then the following coordination stage will be applied. It has a broader operating range than the preceding coordination stage. In order to satisfy the sum of the demands on the power units, one of the other power units, e.g., the second power unit, must satisfy a higher demand. Thus, there results at least one "cross path", which forwards a torque component unable to be set by the one power unit, to another power unit. If the setpoint torque of the one power unit is restricted because of an operating limit of an operating range in one coordination stage, then the difference of unrestricted and restricted setpoint torque, in particular, is switched to the other power unit in addition. In the event that the demand cannot be satisfied, it is provided, in particular, that the demand from one power unit is released to the other power unit upon a change of the coordination stage.

Furthermore, it is advantageously provided that at least one combustion engine and at least one electric machine are used as power units. In particular, the first power unit is the combustion engine, and the second power unit is the electric machine.

In one preferred specific embodiment of the present invention, it is provided that, in a first coordination stage, the combustion engine is operated within an operating range having an ideal basic torque, and/or the electric machine is operated at a first electric machine setpoint torque whose torque gradient is restricted. In the first coordination stage, the combustion engine is operated at the ideal basic torque, for efficiency- and emission-related reasons, in particular, and/or the torque gradient of the setpoint torque of the electric machine is restricted for reasons related to service life.

According to one further development of the present invention, it is provided that, in a second coordination stage, the combustion engine is operated at a first combustion engine setpoint torque within an operating range without suppressed injections, and/or the electric machine is operated within the operating range at the first electric machine setpoint torque whose torque gradient is restricted. To avoid harmful emissions, injection suppressions of individual cylinders or a full blank-out of all cylinders are/is excluded in the second coordination stage.

In one advantageous development of the present invention, it is provided that, in a third coordination stage, the combustion engine is operated within the operating range without suppressed injections at the first combustion engine setpoint torque, and/or the electric machine is operated in an operating range at a second electric machine setpoint torque whose torque is restricted. While the operating limits of the third coordination stage restricting the operating range for the combustion engine may remain unchanged compared to the second coordination stage, the electric machine setpoint torque of the electric machine is restricted to the torque limits of the second electric machine setpoint torque.

According to one further development of the present invention it is provided that, in a fourth coordination stage, the combustion engine is operated at a combustion engine setpoint torque within an operating range that allows the suppression of at least one cylinder of the combustion engine, and/or the electric machine is operated within the operating range at the second electric machine setpoint torque whose torque is restricted. While the operating limits of the operating range for the electric machine may remain unchanged in the fourth coordination stage compared to the third coordination stage, the fourth coordination stage allows a suppression of at least one cylinder of the combustion engine. Higher harmful emissions during operation in the fourth coordination stage in comparison to an operation in the first, second or third coordination stages are permitted in this instance. The at least one cylinder of the combustion engine is blanked out by suppressing an injection, in particular. Specifically, it is provided that the sequence of the successive coordination stages begins with the first coordination stage and ends with one of the further coordination stages.

In one preferred specific embodiment of the present invention, the sequence of the successive coordination stages begins with the first coordination stage and is followed by the second coordination stage, the third coordination stage and finally the fourth coordination stage. Such a fine grading allows a dynamic operation of the hybrid drive at the highest possible efficiency and simultaneously the lowest possible emissions. Furthermore, the overall setpoint torque is advantageously specified by a driver of the vehicle and/or by an intervention of a vehicle-component controller and/or by a driving-safety system of the vehicle. More specifically, the driver specifies the setpoint torque by the position of the driving pedal. The vehicle-component controller is an engine controller or a transmission controller, for instance. The driving-safety system is an electronic stability program ESP, for example.

According to one further development of the present invention, at least one of the coordination stages is blocked or enabled as a function of an operating state. In particular, the blocking or enabling is a function of an operating state of at least one power unit of the hybrid drive and/or components of a drive train.

In one preferred specific embodiment of the present invention, depending on the operating state, different parameters are specified for the torque-gradient limitation of the first electric machine setpoint torque.

Finally, in an advantageous manner it is provided that priorities are set between maintaining the overall setpoint torque and observing individual criteria.

The present invention also relates to a device for implementing a method for dynamic torque coordination of power units of a hybrid drive of a vehicle, in particular a motor vehicle, preferably for implementing the aforementioned method. The method encompasses a plurality of successive coordination stages; each coordination stage is assigned an operating range for at least one of the power units, and each coordination stage makes at least one demand on at least one first power unit and/or at least one second power unit as a function of an overall setpoint torque requested from the hybrid drive, a subsequent coordination stage having an enlarged operating range compared to a preceding coordination stage, and the subsequent coordination stage is used if the demand could not be satisfied within the operating range of the assigned coordination stage. The device is a control device, in particular, preferably a control device integrated into a hybrid-drive control device coordinating the power units. The hybrid-drive control device is superposed to control devices of the individual power units and coordinates the power units via their control devices. Preferably, at least one first one of the power units (drive units) is a combustion engine, and/or at least one second one of the power units is an electric machine. The control device of the combustion engine is an engine control device; the control device of the electric machine is an electro-machine control device.

BRIEF DESCRIPTION OF THE DRAWINGS

The present invention is described in greater detail below.
FIG. 3 shows a response of the dynamic torque coordination to an intervention that reduces the overall setpoint torque.

DETAILED DESCRIPTION OF EXAMPLE EMBODIMENTS

Figure 1:
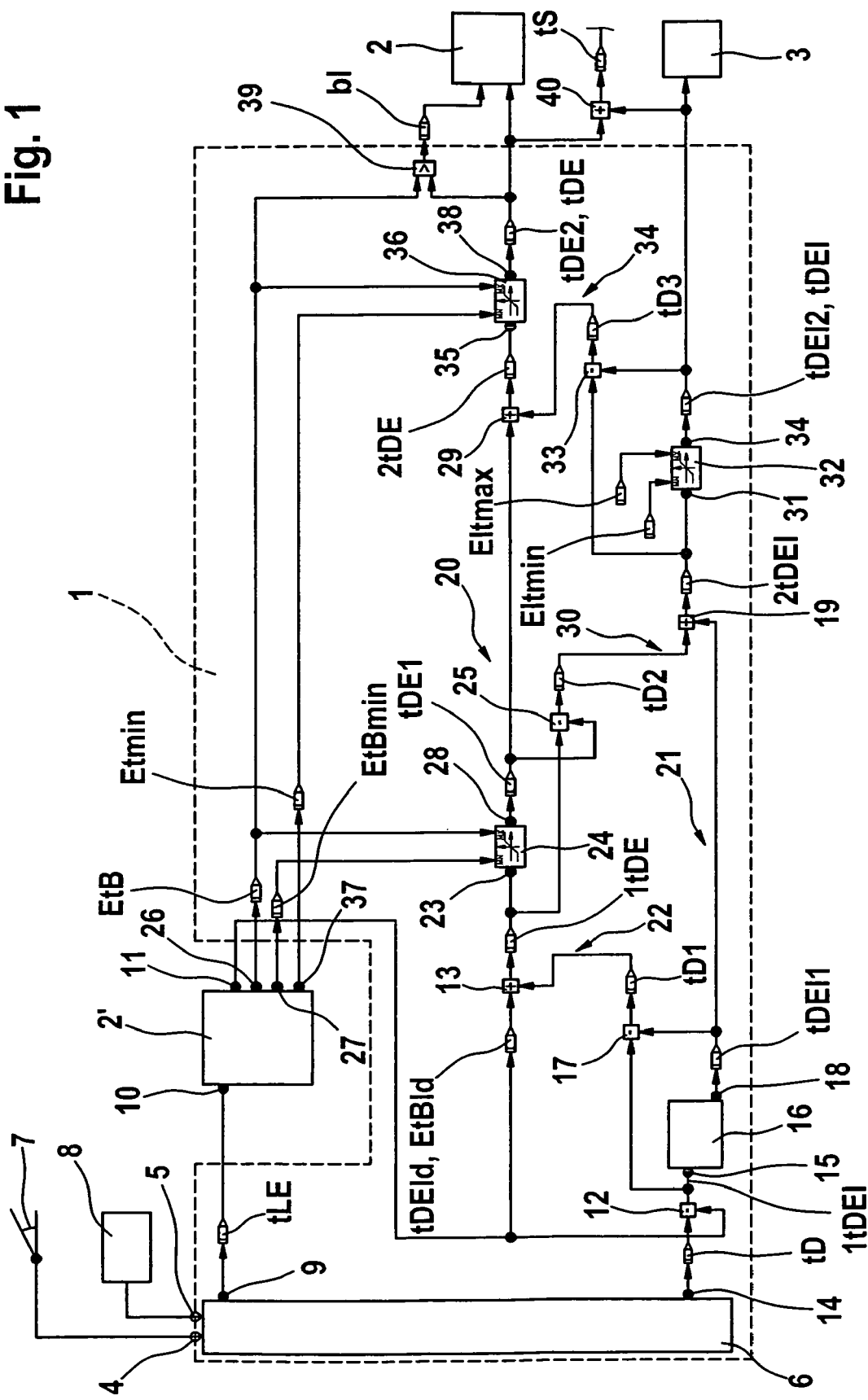
FIG. 1 shows a block diagram of a simulation model.

FIG. 1 shows a block diagram of a device for dynamic torque coordination of a combustion engine 2 and an electric machine 3, the device being developed as control device 1. An air path of combustion engine 2 is shown as block 2', separately from combustion engine 2. In this application, any variables linked to moments of rotation use the abbreviation "torque" instead of "moment of rotation", i.e., for example, overall setpoint torque instead of overall setpoint moment of rotation, or torque limiter instead of moment of rotation limiter.

Control device 1 has two inputs 4, 5, each input being connected to a strategy block 6 of control device 1. Input 4 is connected to a driving pedal 7, and input 5 is connected to a driving-safety or transmission system (block 8). Via the corresponding connection lines, an overall setpoint torque tD is applied to inputs 4, 5 and thus to strategy block 6. Strategy block 6 specifies a lead setpoint torque tLE for combustion engine 2, which in the simulation model is output via output 9 of strategy block 6, to an input 10 of a block 2'. Block 2' simulates the air path of combustion engine 2 (modeled as deadtime element and delay element of the first order) and, via an output 11, outputs an ideal basic torque EtBld or ideal combustion engine setpoint torque tDEld to a first differential block 12 and a first summing block 13. Ideal basic torque EtBld follows the lead setpoint torque tLE with a delay because of the air path dynamics of the air path. Furthermore, via an output 14, strategy block 6 outputs overall setpoint torque tD also to first differential block 12. Differential block 12 forms the difference of overall setpoint torque tD and ideal basic torque EtBld. This difference is a first electro-machine torque demand 1tDEl. First differential block 12 outputs this electro-machine torque demand 1DEl to an input 15 of a torque-gradient restricter block 16 and a second differential block 17. Via an output 18, torque-gradient restricter block 16 outputs a torque-gradient-restricted first electric machine setpoint torque tDEl1 also to second differential block 17 and additionally to a second summing block 19. Torque-gradient restricter block 16 may limit first electric machine setpoint torque tDEl1 to a specified torque range in addition. Ideal basic torque EtBld is the beginning of a combustion engine setpoint torque train 20 leading to combustion engine 2, and first electric machine setpoint torque tDEl1 is the beginning of an electric machine setpoint torque train 21 leading to electric machine 3. Ideal basic torque EtBld and torque-gradient-restricted first electric machine setpoint torque tDEl1 characterize a first coordination stage.

Second differential block 17 forms the difference of first electro-machine torque demand 1tDEl and first electric machine setpoint torque tDEl1. This difference is a first differential torque tD1. Second differential block 17 outputs first differential torque tD1 via a first cross path 22 to first summing block 13, which—as previously mentioned—receives ideal basic torque EtBld from block 2' as additional input signal. Summing block 13 forms the sum of ideal basic torque EtBld and first differential torque tD1. This sum is a first combustion-engine torque demand 1tDE. First combustion-engine torque demand 1tDE is applied to an input 23 of a first torque-limiting block 24 and a third differential block 25. First torque-limiting block 24 limits combustion-engine torque demand 1tDE to a torque range between torque limits of an efficiency-optimized basic torque EtB specified by the air path, and a minimum basic torque EtBmin likewise specified by the air path, which is achievable without suppressing an individual cylinder or a plurality of cylinders of combustion engine 2. In an operation of combustion engine 2 without suppressed injections, this torque range is able to be set by an ignition timing adjustment. In the simulation model of FIG. 1, the air path (block 2') outputs these signals to first torque-limiting block 24 via outputs 26, 27. Ideal basic torque EtBld conforms to efficiency-optimized basic torque EtB in many operating states. With an active torque reserve, ideal basic torque EtBld lies below efficiency-optimized basic torque EtB, for instance in order to heat a catalytic converter by means of a requested drop in efficiency. Via an output 28, torque-limiting block 24 outputs a torque-restricted first combustion engine setpoint torque tDE1 to third differential block 25 and, via combustion engine setpoint torque train 20, to a third summing block 29. First combustion engine setpoint torque tDE1, restricted in torque without injection suppression, and torque-gradient-restricted first electric machine setpoint torque tDEl1 characterize a second coordination stage.

Third differential block 25 forms the difference of first combustion-engine torque demand 1tDE and first combustion engine setpoint torque tDE1. This difference is a second differential torque tD2. Third differential block 25 outputs second differential torque tD2 via a second cross path 30 to second summing block 19, which—as previously mentioned—receives first electric machine setpoint torque tDEl1 from torque-gradient-limiting block 16 as further input signal. Second summing block 19 forms the sum of second differential value tD2 and first electric machine setpoint torque tDEl1. This sum is a second electro-machine torque demand 2tDel. Second summing block 19 outputs this second electro-machine torque demand 2tDEl to an input 31 of a second torque-limiting block 32 and a fourth differential block 33. Via an output 34, second torque-limiting block 32 outputs an electric machine setpoint torque tDEl also to fourth differential block 33 and, additionally in electric machine setpoint torque train 21, to electric machine 3 or a control device (not shown) of electric machine 3 (electro-machine control device). Electric machine setpoint torque tDE1 is also denoted as second electric machine setpoint torque tDEl2 for better differentiation from first electric machine setpoint torque tDEl1. Second torque-limiting block 32 limits electro-machine torque demand 2tDEl to a torque range between an upper torque limit Eltmax and a lower torque limit Eltmin. Torque-limited first combustion engine setpoint torque tDE1 and torque-limited electric machine setpoint torque tDE1 characterize a third coordination stage.

Fourth differential block 33 forms the difference of second electro-machine torque demand 2tDEl and second electric machine setpoint torque tDEl2. This difference is a third differential torque tD3. Fourth differential block 33 outputs third differential torque tD3 via a third cross path 34 to third summing block 29, which—as previously mentioned—receives first combustion engine setpoint torque tDE1 from first torque-limiting block 24 as further input signal. Third summing block 29 forms the sum of first combustion engine setpoint torque tDE1 and third differential torque tD3. This sum is a second combustion-engine torque demand 2tDE. Second combustion-engine torque demand 2tDE is applied to an input 35 of a third torque-limiting block 36. Third torque-limiting block 36 limits combustion-engine torque demand 2tDE to a torque range between torque limits of basic torque EtB specified by the air path, and a minimum combustion-engine torque Etmin, which is achievable with the aid of ignition timing and suppression of a single cylinder or a plurality of cylinders of combustion engine 2. In this context the following applies:

$$Etmin < EtBmin < EtBld \leqq EtB.$$

In the simulation model of FIG. 1, the air path (block 2') outputs these signals via outputs 26, 37 to third torque limiting block 36. Via an output 38, third torque-limiting block 36 outputs a torque-limited combustion engine setpoint torque tDE via combustion engine setpoint torque train 20 to combustion engine 2 or a not depicted control device of combustion engine 2 (engine control device), and to a comparison block 39. Combustion engine setpoint torque tDE is also denoted as second combustion engine setpoint torque tDE2 for better differentiation from first combustion engine setpoint torque tDE1. Comparison block 39 compares combustion engine setpoint torque tDE to basic torque EtB and outputs an enabling mark of ignition angle b1 to the control device of combustion engine 2. A fourth summing block 40 forms the sum of second combustion engine setpoint torque tDE2 and electric machine setpoint torque tDEl. This sum is an overall setpoint torque tS of the hybrid drive. Torque-limited combustion engine setpoint torque tDE and torque-limited electric machine setpoint torque tDEl characterize a fourth coordination stage.

Four coordination stages therefore result, which have the following operating ranges:

"Operation of the combustion engine at the ideal basic torque for reasons of efficiency, and torque-gradient restriction of the electro-machine torque demand for reasons related to service life" in the first coordination stage;

"Avoidance of injection suppressions of individual cylinders or complete suppression (for emission-related reasons, for example), torque-gradient restriction of the electric machine torque demand for reasons related to service life" in the second coordination stage;

"Avoidance of injection suppressions of individual cylinders or complete suppression (for emission-related reasons, for example), limitation of the electric machine torque demand to the torque limits Eltmax and Eltmin" in the third coordination stage;

"Enabling of injection suppressions of individual cylinders or complete suppression, limitation of the electro-machine torque demand to the torque limits Eltmax and Eltmin" in the fourth coordination stage.

Figure 2:
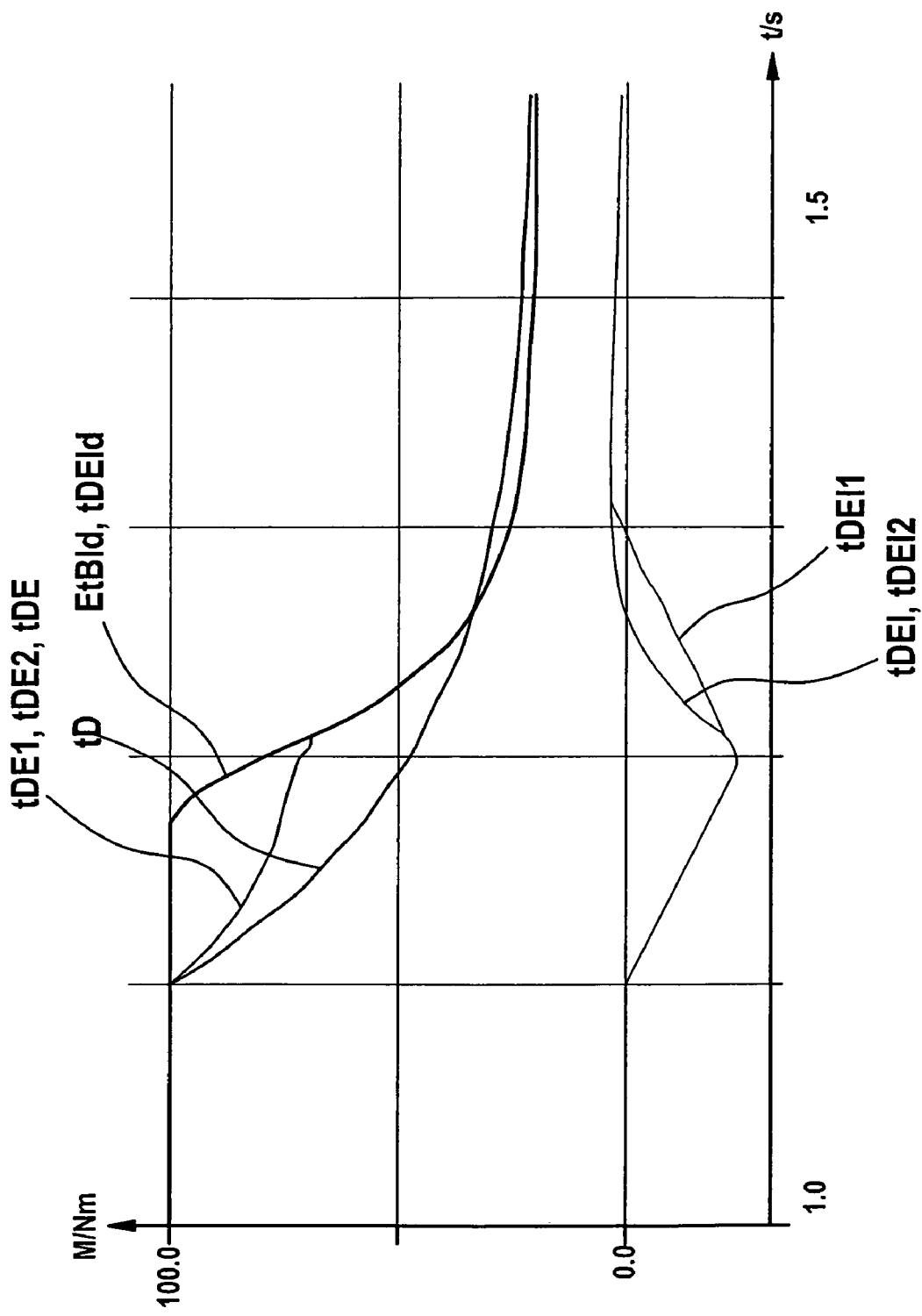
FIG. 2 shows a simulation result in a stepwise reduction of the overall setpoint torque.

FIG. 2 shows a diagram in which torques (moments of rotation) M are plotted above time t. The plotted torques are overall setpoint torque tD, ideal basic torque EtBld, gradient-restricted first electric machine setpoint torque tDEl1, electric machine setpoint torque tDEl (or tDEl2), and combustion engine setpoint torque tDE (or tDE2). The simulation results shown in FIG. 2 correspond to a stepwise release of driving pedal 7 by the driver of the vehicle. Ideal basic torque EtBld, and thus ideal setpoint torque tDEld, follow lead setpoint torque tLE with a delay in accordance with the air-path dynamics. For reasons of comfort, a low-pass-filtered transition in overall setpoint torque tD from 100 Nm to 20 Nm is specified in strategy block 6. The first coordination stage attempts to operate combustion engine 2 at ideal combustion engine setpoint torque tDEld (equivalent to ideal basic torque EtBld), and to compensate its delayed response with the aid of a dropping first electric machine setpoint torque tDEl1 of electric machine 3. However, this is not completely possible due to the gradient limitation of first electric machine setpoint torque tDEl1. Thus, a temporary deviation of first combustion engine setpoint torque tDE1 from ideal basic torque EtBld takes place in the second coordination stage, in conjunction with an enabling of ignition angle b1=1.

Starting at instant t=1.2 seconds, ideal basic torque EtBld decreases more heavily, and gradient-restricted electric machine setpoint torque tDEl1 increases accordingly. Since an increase in combustion engine setpoint torque tDE beyond efficiency-optimized basic torque EtB (which corresponds to ideal basic torque EtBld in the exemplary embodiment because no torque reserves are available) is impossible, the demand for gradient limitation of electric machine 3 must be violated in order to maintain the characteristic of overall setpoint torque tD. Electric machine setpoint torque tDEl temporarily deviates in an upward direction from gradient-restricted setpoint torque tDEl1 (third coordination stage). Overall torque tS of the two setpoint torques tDEl, tDE of power units 2, 3 corresponds to sum-setpoint torque tD.

FIG. 3 shows a diagram in which torques M are plotted above time t. The plotted torques are overall setpoint torque tD, ideal basic torque EtBld, gradient-restricted first electric machine setpoint torque tDEl1, electric machine setpoint torque tDEl, and combustion engine setpoint torque tDE. The diagram of FIG. 3 shows a response of the dynamic torque coordination to a rapid, torque-reducing external intervention such as by a driving-safety system (block 8), in particular an ESP intervention, in conjunction with a ramp-type characteristic of sum-setpoint torque tD. It is simply assumed that there are no consequences on ideal basic torque EtBld and thus on ideal combustion engine setpoint torque tDEld since the duration of the intervention is correspondingly brief. FIG. 3 shows the sequential response of the various coordination stages. In this context, the following applies to the minimum basic torque:

$EtB\text{min}=60$ Nm, and the lower torque limit of electric machine 3:

$EltD\text{min}=-24$ Nm.

Overall setpoint torque tD decreases more strongly than gradient-restricted first electric machine setpoint torque tDEl1, so that, beginning with the external intervention, an ignition-angle intervention takes place in conjunction with a deviation of first combustion engine setpoint torque tDE1 from ideal basic torque EtBld, which corresponds to ideal combustion engine setpoint torque tDEld. In a complete intervention, combustion engine setpoint torque tDE deviates from first combustion engine setpoint torque tDE1 in a downward direction, in conjunction with a cylinder-individual injection suppression.

The example method according to the present invention allows a precise implementation of overall setpoint torque tD even if the dynamics of the air path (block 2') of combustion engine 2 vary considerably, the dynamics being a function of the operating point of the combustion engine (defined by torque, engine speed et cetera). The use of electric machine 3 makes it possible to minimize ignition-angle interventions, which may lead not only to losses in efficiency but, at high loads, also to temperature spikes in the catalytic converter and may limit its service life. Furthermore, it is possible to minimize the injection suppression of individual cylinders, which cause higher emissions. Considerations regarding the service life of electric machine 3, an energy store etc. are likewise taken into account. The priority of the individual restrictions may be specified by the multi-stage coordination.

In the exemplary embodiment, a use of the method according to the present invention is described for a combustion engine 2 developed as Otto engine, and for an electric machine 3 developed as crankshaft-starter generator. Demands, their prioritization and measures resulting therefrom are examples. Modified or completely different decision principles, which are based on other types of power units, for instance, may be used as basis. The criteria may, for example, be more general criteria for an efficiency-optimized implementation of the torques, instead of an avoidance of ignition-angle interventions in the Otto engine.

In one advantageous development of the present invention, it is possible to enable or block individual coordination stages, depending on the operating state.

In one further development of the present invention, it is possible to additionally prioritize between maintaining the overall setpoint torque and observing individual criteria. This is done, for instance, by tolerating a deviation of overall instantaneous torque tS of the two power units 2, 3 from overall setpoint torque tD in favor of maintaining the electric machine setpoint torque.

In addition, depending on the operating state, it is advantageous to specify different parameters for the torque-gradient restriction of first electric machine setpoint torque tDEl1. For reasons related to service life, different torque limits for the electric machine, which allow utilization of the complete torque range only in safety-critical external interventions but otherwise only permit an operation at reduced torque limits may be useful as well.

What is claimed is:

1. A method for dynamic torque coordination of power units of a hybrid drive of a motor vehicle, comprising:
    assigning each of a plurality of successive coordination stages an operating range for at least one of the power units;
    making, by each coordination stage, at least one demand on at least one of a first power unit and a second power unit, as a function of an overall setpoint torque demanded from the hybrid drive; and
    using a subsequent coordination stage if the demand was unable to be satisfied within the operating range of the assigned coordination stage, the subsequent coordination stage having an enlarged operating range as compared to a preceding coordination range;
    wherein, if a demand on a power unit is unable to be satisfied within the operating range of the coordination stage, the demand is forwarded, in full or in part, to another power unit, and wherein one of the power units is an electric machine, and wherein the electric machine is operated in at least one of the coordination stages at an electric machine setpoint torque having one of a restricted torque or a restricted torque gradient.

2. A method for dynamic torque coordination of power units of a hybrid drive of a motor vehicle, comprising:
    assigning each of a plurality of successive coordination stages an operating range for at least one of the power units;
    making, by each coordination stage, at least one demand on at least one of a first power unit and a second power unit, as a function of an overall setpoint torque demanded from the hybrid drive; and
    using a subsequent coordination stage if the demand was unable to be satisfied within the operating range of the assigned coordination stage, the subsequent coordination stage having an enlarged operating range as compared to a preceding coordination range;
    wherein at least one combustion engine and at least one electric machine are used as power units, and wherein, in a first coordination stage, the electric machine is operated in an operating range at a first electric machine setpoint torque whose torque gradient is restricted.

3. The method as recited in claim 2, wherein, in a second coordination stage, at least one of i) the combustion engine is operated in an operating range without suppressed injections, at a first combustion engine setpoint torque, and ii) the electric machine is operated within the operating range at the first electric machine setpoint torque whose torque gradient is restricted.

4. The method as recited in claim 3, wherein, in a third coordination stage, at least one of i) the combustion engine is operated within the operating range without suppressed injections, at the first combustion engine setpoint torque, and ii) the electric machine is operated in an operating range at a second electric machine setpoint torque whose torque is restricted.

5. The method as recited in claim 4, wherein, in a fourth coordination stage, at least one of i) the combustion engine is operated in an operating range at a second combustion engine setpoint torque that allows the suppression of at least one cylinder of the combustion engine, and ii) the electric machine is operated within the operating range at the second electric machine setpoint torque whose torque is restricted.

6. The method as recited in claim 5, wherein a sequence of successive coordination stages begins with the first coordination stage and is followed by the second coordination stage, the third coordination stage and finally the fourth coordination stage.

7. The method as recited in claim 5, wherein an overall setpoint torque is specified via at least one of a driving pedal by a driver of the vehicle, and an intervention of a vehicle-component control, and a driving-safety system of the vehicle.

8. The method as recited in claim 5, wherein at least one of the coordination stages is blocked or enabled as a function of an operating state of the hybrid drive.

9. The method as recited in claim 5, wherein, depending on an operating state, different parameters are specified for a torque-gradient restriction of the first electric machine setpoint torque.

10. The method as recited in claim 5, wherein priorities are set between maintaining an overall setpoint torque and observing individual criteria.

11. A device for dynamic torque coordination of power units of a hybrid drive of a motor vehicle, comprising:
    a component adapted to assign each of a plurality of successive coordination stages an operating range for at least one of the power units, each coordination stage making at least one demand on at least one of: i) at least one first power unit, ii) at least one second power unit as a function of an overall setpoint torque demanded from the hybrid drive, a subsequent coordination stage having an enlarged operating range compared to a preceding coordination stage, and the subsequent coordination stage is used if the demand was unable to be satisfied within the operating range of the assigned coordination stage;
    wherein at least one combustion engine and at least one electric machine are used as power units, and wherein, in a first coordination stage, the electric machine is operated in an operating range at a first electric machine setpoint torque whose torque gradient is restricted.

* * * * *